United States Patent
Lang

[15] 3,677,088

[45] July 18, 1972

[54] DISPOSABLE TYPE THERMOMETER

[72] Inventor: Robert A. Lang, East Hanover, N.J.

[73] Assignee: Bio-Medical Sciences, Inc., Fairfield, N.J.

[22] Filed: March 4, 1971

[21] Appl. No.: 120,995

[52] U.S. Cl.................................................73/356, 73/358
[51] Int. Cl....................................G01k 11/08, G01k 11/16
[58] Field of Search..........................73/358, 356; 116/114.5; 99/192 TT

[56] References Cited

UNITED STATES PATENTS

| 3,175,401 | 3/1965 | Geldmacher | 73/358 |
| 3,430,491 | 3/1969 | Gignilliat | 73/358 |
| 3,597,976 | 8/1971 | Fryar | 73/358 |

Primary Examiner—Louis R. Prince
Assistant Examiner—Denis E. Corr
Attorney—Watson Leavenworth & Kelton

[57] ABSTRACT

A thermometer having a thermally sensitive substance deposited on a thermally conductive sheet, and an overlying transparent film carrying indicator means which are superpositionably registrable with the thermally responsive substance for communicating therewith to denote specified temperatures upon change of state of the substance is provided with a readily removable flexible shield interposed between the thermally responsive substance and indicator means to prevent communication and reaction between the two until the thermometer is actually required for use. The shield is readily removably adhesively secured to the transparent film and can be peelably removed therefrom by pulling action applied digitally to a pull tab at one end of the shield. Concurrent with peeling of the shield from the transparent film, the latter is pressed against the thermally conductive sheet to position the indicator means in proper overlying communicating registration with the temperature responsive substance on the carrier sheet.

13 Claims, 6 Drawing Figures

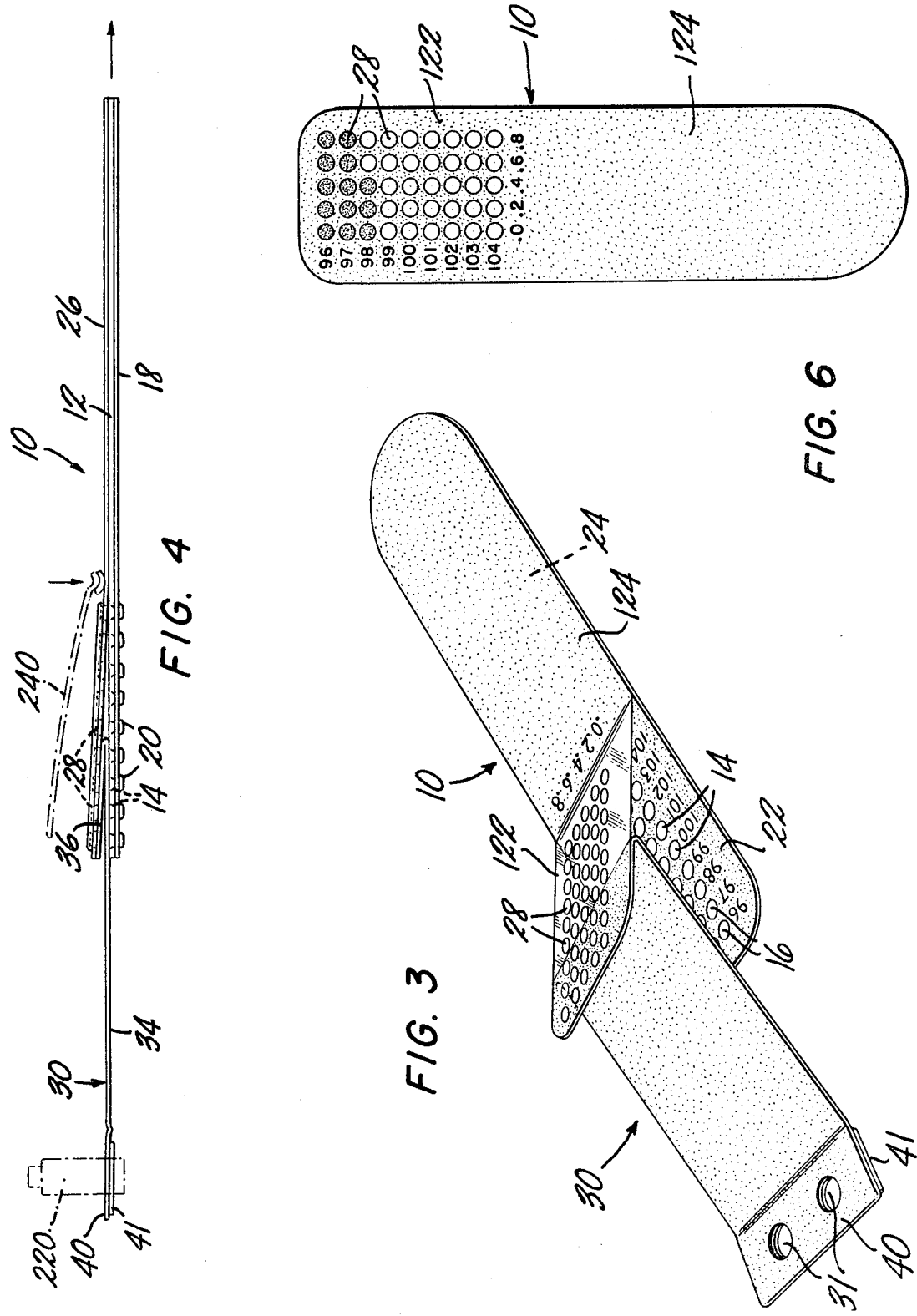

DISPOSABLE TYPE THERMOMETER

BACKGROUND OF THE INVENTION

Temperature indicating devices, i.e., thermometers utilizing a thermally responsive substance which responsive to temperature change in a test subject, undergoes a change of state which state change is manifested in suitable indicator means to indicate a precise temperature, are known. One form of such thermometer is disclosed in pending application Ser. No. 058,001 entitled "Temperature Indicator" filed July 24, 1970.

The thermometer described in the aforementioned patent application is comprised of a thermally conductive sheet in which is formed a number of cavities, each being filled with a thermally responsive substance provided in such quantity and/or composition as permits for change of the substance from solid to liquid state in graduated sequence responsive to the temperature of the subject being tested. Also provided in that thermometer is an indicator means in suitable form, such as a dyestuff, which upon melting of the thermally responsive substance in the respective cavities cooperates with an acceptor as by migration thereto, to indicate visually by change of color of the acceptor a precise condition of temperature associated with each cavity. Overlying the conductive sheet is a transparent covering film of a suitable polymeric material which functions to seal and thereby physically isolate the thermally responsive substance, dyestuff and acceptor associated with each of the respective cavities from communication with any of the others, and also to prevent incursion of foreign matter to the cavities as well as to prevent direct contact of the subject being tested with the thermally responsive substance and indicator means. Such thermometer is well adapted for the intended purpose of measuring the temperature of the test subject, is reliable in operation and is possessed of a structural character optimally suited for manufacturing the thermometer on mass production high speed machinery so that it can be relatively inexpensively produced and thus be disposable after a single use. However, the construction of the thermometer described in the aforementioned application is not such that it possesses a practical or convenient arrangement of an optimally removable barrier with which communication between the thermally responsive substance and the indicator means can be prevented before the time of actual use of the thermometer on the test subject.

Such barrier ideally should be provided by means which readily and easily can be incorporated in the thermometer during manufacture on high speed machinery and should be removable easily and readily from the thermometer at time of use. Further, such means should allow that upon removal of the communication barrier, the thermometer indicator means retains proper registration disposition with the thermally responsive substance to insure accurate indication of a precise temperature. Removal of the barrier also should be achieved in such a manner as to insure the sealing of the transparent film to the thermally conductive sheet to prevent the thermally responsive substance from coming into direct contact with the test subject and to prevent the substance in one cavity from communicating with that in another or the indicator means associated with such cavity.

SUMMARY OF THE INVENTION

The present invention is concerned generally with improvements in temperature indicating devices. It is more specifically concerned with improvements in thermometers which function on the principle of a temperature induced change in the state of a thermally responsive substance to indicate a specified condition of temperature. A type of thermometer to which it is particularly applicable is that described in the aforementioned pending application Ser. No. 058,001. The thermometer type described in said application can be comprised of a thermally conductive sheet provided, e.g., as a sheet of metallic foil, and having a film of polymeric material covering one face surface thereof so as to provide strength and resiliency to the sheet, if required, and also to isolate the foil from direct contact with the test subject. The thermally conductive sheet can be provided with a plurality of cavities, and disposed in such cavities on the uncoated face of the foil carrier sheet are a corresponding plurality of deposits of thermally responsive substances. The substances filling the cavities are designed with respect to each of the deposits thereof to undergo a change of state at a predetermined temperature and in conjunction with appropriate indicator means to give visual indication of the temperature of a test subject, the arrangement being such that the change of state of the substance in any one cavity is, in cooperation with the associated indicator means, indicative of a temperature different from that associated with any other cavity and substance deposited therein. The indicator means which overlies the deposit in each cavity is in the form, e.g., of a pigment or dyestuff and an acceptor such as a filter paper, the arrangement being such that upon change of state of the thermally responsive substance from solid to liquid state, the dyestuff or pigment causes the acceptor to change color and to thereby signal the condition of temperature which initiated melting of the temperature responsive substance. Overlying the thermally conductive sheet, the temperature responsive means and the indicator means components is a film of polymeric transparent material which assists in isolating the elements of the system from the test subject and in providing structural integrity and resiliency to the thermometer structure.

In accordance with the present invention there is provided for a disposable type thermometer a separator shield which during the manufacture of the thermometer is removably inserted between the thermally responsive substance and the indicator means to bar communication therebetween until the thermometer actually is to be used. The shield in one advantageous form thereof, is provided as a strip of flexible material such as aluminum, which may be covered on one or both of its opposite side faces with a material which is non-reactive with the materials of the thermometer which it contacts, i.e., the thermally responsive substance and the indicator means. The flexible sheet comprising the shield is folded back upon itself to form at least two portions thereof which are positioned with the first portion overlying and coextensive with an indicator section of the carrier sheet, i.e., the section thereof on which is deposited the thermally responsive substance, in covering position over such substance. The second portion of the flexible strip is positioned coextensive with and removably adhered to the indicator section of the transparent film, i.e., the section thereof adhesively carrying the indicator means. Removal means, e.g., a pull tab is provided on the shield to facilitate its removal from the thermometer preliminary to using the latter. The transparent film which overlies the thermometer foil thermally conductive sheet is provided with an adhesive coating thereon, such adhesive functioning, inter alia, as the means with which the indicator means is secured to the transparent film. Prior to the use of the thermometer, the transparent film at the temperature indicating end of the thermometer, along with the shield, lies in close superpositioning above the thermally responsive substance carrying end of the carrier sheet with the indicator means in register above the deposited masses of thermally responsive substance. For convenience, the tab part of the shield may be disposed so as to extend outwardly longitudinally of the tip end of the thermometer and thus provide a gripping surface on the shield. By holding the tab and pulling on the other end of the thermometer, or vice versa, the shield is caused to peel away from the underface of the transparent film to which it is secured in a direction away from the handle section of such film without affecting the positioning or securement of the indicator means to such surface, the pulling force being applied until the shield is completely removed from the thermometer. The transparent film at the temperature indicating end can then be pressed into registering superpositioned contact with the thermally conductive sheet thereby establishing communication between the temperature responsive substance and the indicator means and rendering the thermometer operative for its intended purpose.

The invention accordingly comprises the thermometer possessing the features, properties and relation of elements which will be exemplified in the devices hereinafter described and the scope of the present invention will be indicated in the claims.

BRIEF DESCRIPTION OF THE DRAWINGS

Other objects of the invention will be in part obvious and will in part appear from the following detailed description taken in conjunction with the accompanying drawings, wherein like reference numerals identify like parts throughout and in which:

FIG. 3 is a perspective view of the thermometer shown in FIGS. 1 and 2 with the temperature indicating end opened and the shield in an intermediate position of removal following initiation of the peeling of the same from the indicator section of the transparent film but before completion of such removal.

FIG. 4 is a side elevational view of a thermometer showing schematically the manner of removing the shield and the manner in which the indicator section of the transparent film concurrently is pressed against the thermally responsive substance on the thermally conductive sheet to registrably superposition the indicator means on the thermally responsive substance and seal the indicating end of the thermometer with the transparent film.

FIG. 6 is a plan view depicting a thermometer following use thereof for recording the temperature of a test subject.

DESCRIPTION OF THE PREFERRED EMBODIMENTS

The present invention is concerned with an improved form of thermometer and particularly a thermometer of disposable character, i.e., one which can be discarded following a single use. Accordingly, such thermometer must be easy and inexpensive to make. It must be simple to use and provide optimum accuracy of temperature indication respecting the test subject and be harmless to use when employed for human testing application. Further, the thermometer which embodies a thermally responsive chemical substance in conjunction with an indicator means should be designed to be inoperative until actual use, i.e., the thermally responsive substance should be isolated from communicating with the indicator means until such communication is necessary for operative use of the thermometer. In this manner temporary and inadvertent change of state of the thermally responsive substance will not result in indication of temperature.

Figure 5:
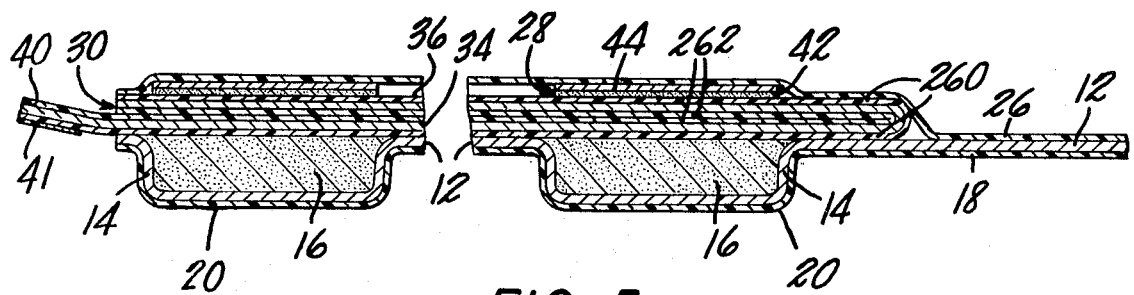
FIG. 5 is a vertical sectional view of the temperature indicating end of the thermometer shown in FIGS. 1-4 on greatly enlarged scale with the transparent film indicator section pressed closed against the shield which in turn is interposed between the former and the thermally responsive substance deposited on the thermally conductive sheet.
Figure 1:
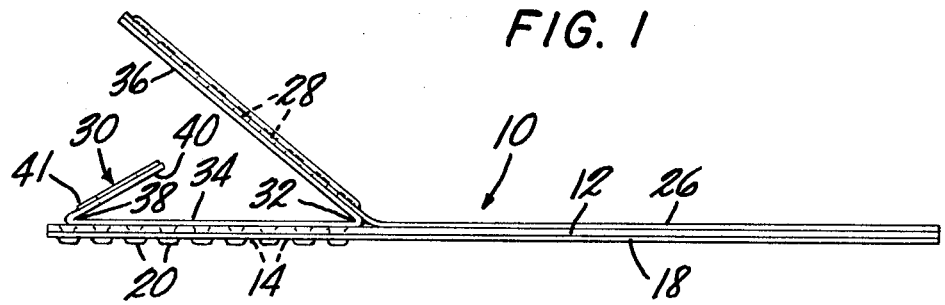
FIG. 1 is a side elevational view of a thermometer constructed in accordance with the principles of the present invention and embodying a shield therein which is interposed between the thermally conductive sheet on which is deposited the thermally responsive substance, and the transparent film on which is received and carried the indicator means, the indicator means and associated indicator section of the transparent film being shown positioned a distance above the indicator section of the thermally conductive sheet.
Figure 2:
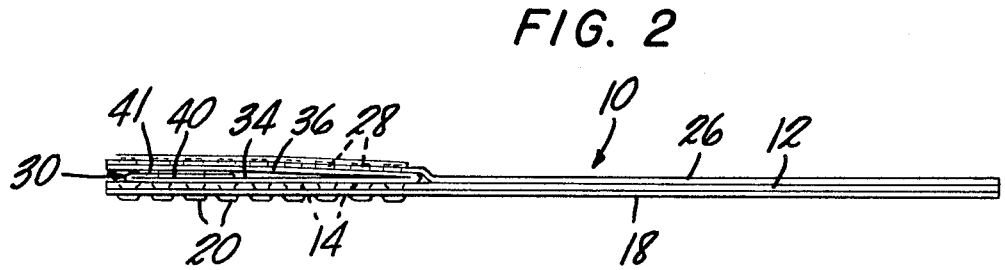
FIG. 2 is a side elevational view of the device shown in FIG. 1 except it illustrates the indicator section of the transparent film with the indicator means carried thereon folded down closed against the shield which is sandwiched between the indicator means and the temperature responsive substance, the tab on the shield with which shield removal is initiated being folded inwardly of the adjacent tip end of the indicating end of the thermometer.

In the ensuing description of the improved thermometer provided by the present invention, continuing reference should be had to FIGS. 1-3 of the drawings. Referring now to such FIGURES, the thermometer 10 is comprised of a thermally conductive sheet 12 in which is formed a plurality of depressions or cup-shaped cavities 14, the cavities being provided in such numbers as may be required to provide a reasonable range of temperature indication depending on the subject for which the thermometer is to be used. Thus, with respect to testing humans, a temperature range capacity of between 96°F. and 104.8°F. is acceptable with each degree being further graduated in two-tenths of a degree, there being provided a separate cavity 14 for each of the last-mentioned graduations, the pattern of the cavity disposition and associated testing range being evident by reference to FIG. 6 from which it may be noted a printing of indicia also can be provided on the carrier sheet to denote specific temperature values. Sheet 12 conveniently is provided as a sheet or strip of a good thermally conductive material such as a foil of a metal, e.g., an aluminum foil which has a certain strength and which is a good thermally conductive material for enhancing transmission of heat to the thermally responsive substance 16 deposited in each cavity 14 (FIG. 5). The thermally responsive substance 16 can be a chemical system suited for the intended purpose, e.g., one of the compositions described in the concurrently filed application of Zsigmond Sagi et al antitled "A Temperature Indicator". As can be noted best from FIG. 3, the thermally conductive sheet 12 has a first longitudinal portion shown generally at 22 which defines or provides an indicator section for such sheet, and a remaining longitudinal portion shown generally at 24 which provides a handle section.

To increase the overall strength of the thermally conductive sheet 12 and to prevent accidental puncture of the cavities 14 as when the thermometer is received in a human test subject's mouth and thereby preclude mouth contact with the thermally responsive substance 16, the thermally conductive sheet 12 can be provided at the face thereof opposite that on which the thermally responsive substance is deposited, with a layer 18 or coating of a polymeric material such as Mylar, the layer 18 being coextensive with the sheet 12 and affixed thereto in any suitable manner, the layer conformally contouring as at 20 with the cup-shaped cavities 14.

Overlying the thermally conductive sheet 12 and of coextensive character therewith is a transparent film 26 of polymeric material which like layer 18 preferably is Mylar and which serves, as will appear later, a number of important purposes including providing a support for indicator means shown generally at 28. Transparent film 26 also has portions thereof defining an indicator section 122 and a handle section 124 corresponding with indicator section 22 and handle section 24 respectively of the thermally conductive sheet 12. The underface of transparent film 26 is provided with an adhesive coating, such adhesive being generally a pressure sensitive type as which will permit peelable removal therefrom of a shield adhesively secured thereto in a manner to be described later. Such adhesive, as will be apparent from further description herein, should be inert respecting the thermally responsive substance 14 so as to not affect its operative functioning. An adhesive suitable for use with Mylar is one incorporated in a product sold by Johnson and Johnson of New Brunswick, N.J., under the trademark J-Lar. The handle section 124 of the transparent film 26 is adhesively secured in face-to-face contact with the corresponding section 24 of the thermally conductive sheet 12 and remains in that arrangement permanently following manufacture of the thermometer. The other indicator section 122 of the transparent film 26, as mentioned earlier, provides a support for carrying the indicator means 28 which means can be provided as a plurality of indicator components, e.g., a matrix of paper dots adhered to the surface of transparent film 26 in number and positioning in correspondence to the arrangement of cavities 14 in the sheet 12. With the transparent film 26 pressed down in the position shown in FIG. 2 or in the manner depicted in FIG. 5, each of the indicator means 28 lies disposed superpositioned registrably with one of the cavities 14.

The present invention provides that the thermometer 10 remains inoperative to detect and indicate a temperature value until actually required for use on a test subject at which time it can be rendered operative in a matter of a few seconds, all of the foregoing being achieved without sacrifice to the reliability or accuracy of the thermometer. For this purpose, thermometer 10 is provided with a shield 30 interposed between the thermally responsive substance 16 and the indicator means 28 to prevent communication therebetween until such time as the thermometer is to be used. A more particular description of the shield 30 will be given next.

Shield 30 conveniently is formed from a flexible material such as a foil of aluminum, the basic shield form being provided as an elongated foil strip covered on one or both of its opposite faces with coatings of suitable polymeric material and embodying pull tab means for initiating removal of the shield. As seen in FIG. 1, the shield 30 is formed such that it is folded upon itself in at least one fold along a fold line 32 to provide a first shield portion 34 generally coextensive with the indicator section 22 of the thermally conductive sheet 12 and normally disposed in overlying but unsecured contact with indicator section 22, and a second shield portion 36 coextensive with the indicator section 122 of the transparent film 26. The shield 30 also is provided with a second fold therein along a second fold line 38 to provide a third shield portion 40 which serves as a pull tab for digitally initiating removal of the shield from its operative position in the thermometer. The second portion 36 of the shield is coextensive with and adhesively secured to the underface of the indicator section 122 of the transparent film 26 and accordingly covers the respective indicator means 28 adhesively secured to such transparent film in the manner earlier described. The adhesive bond between the shield second portion 36 and transparent film is not such as removal of the shield from the thermometer induces or promotes any stretching of transparent film 26 which could prevent achieving proper registration of the indicator means 28 with the thermally responsive substance when pressing indicator section 122 into sealing contact with indicator section 22. At the same time such bond is sufficient to hold the shield second portion 36 in firm face-to-face contact with the transparent film 26 to prevent any volatilization of solvent from the adhesive on the film or the admission to the indicator means of any vapor of sublimation of the thermally responsive substance deposited in the discrete cavities 14 if such should occur while the thermometer is stored during a non-use period when the indicator section 122 of the transparent film normally lies pressed down in close contact over the indicator section 22 of the thermally conductive sheet 12 with the shield 30 sandwiched therebetween as depicted in FIG. 2.

The thermometer 10 prior to use normally is not operative to record a temperature value. If it is desired to use the thermometer on a test subject and thus render it operative, such change can be accomplished most expeditiously. In inoperative condition, as depicted in FIG. 2, shield 30 is sandwiched between the indicator section 122 of transparent film 26 and indicator section 22 of carrier sheet 12. As a preliminary, the indicator section 122 can be opened, i.e., swung upwardly, to the position shown in FIGS. 1 and 3 to provide access to pull tab 40 for digital grasping of the same, whereupon the pull tab is swung about second fold line 38 adjacent the tip end of the thermometer and outwardly of the thermometer indicating end beyond the tip end thereof. In removing the shield, the use may initiate peeling by applying a pulling force to the pull tab 40 while holding the thermometer near the juncture of the respective indicator sections and handle sections of the thermally conductive sheet 12 and transparent film 26, or by holding the pull tab 40 and applying the pulling force to the thermometer to peel the shield in a direction away from the handle section of the transparent film. For the purpose of providing reinforcement of the pull tab portion of the shield to prevent accidental severance of the former from the latter, a reinforcing tape strip 41 can be applied to one face of the pull tab to obviate such possibility of tearing of the same at the initial action of peeling. The application of such pulling force of moderate magnitude is effective to initiate peeling of the second portion 36 away from the underface of transparent film indicator section 122 starting at fold line 32 which as can be seen in FIGS. 1 and 2, is disposed adjacent the juncture of the respective indicator sections and handle sections. Continued application of the pulling force will result in the peeling away of the shield second portion 36 in the manner shown in FIGS. 3 and 4 in a direction away from the transparent film handle section 124 until the second portion 36 is completely removed from its adhesive contact with the underface of transparent film indicator section 122 and without disturbing the positioning of the indicator means 28 secured to the transparent film 26. During peeling removal of shield 30 from the thermometer if same is accomplished wholly by digital manipulation, the transparent film indicator section 122 carrying indicator means 28 will not become displaced, i.e., swung upwardly, too far from the indicator section 22 of sheet 12 so that following complete removal of the shield, the user need employ only a light pressing force against the transparent film indicator section 122 to put it in face-to-face contact with the carrier sheet indicator section 22 and bring the indicator means 28 into superposed registration with the thermally responsive substance filled cavities 14 placing such components in communication and thereby rendering the thermometer operative for its intended use. The removal of shield 30 from the thermometer 10 and pressing or sealing of transparent film indicator section 122 against the thermally conductive sheet indicator section 22 also can be accomplished by means of devices within a dispenser of the type described in the concurrently filed application of Charles G. Pickett et al. entitled "Dispenser for Disposable Type Thermometers". In a dispenser of the type described in said Pickett et al. application, the thermometer 10 can be received therein with the pull tab 40 thereof staked over a post means 220 (FIG. 4) for which purpose the pull tabs are provided with staking holes 31. Thus, when a pulling force X is applied to the opposite or handle end of the thermometer, the shield will remain anchored in the dispenser while the thermometer exits therefrom, the shield peeling off as depicted in FIG. 4. Concurrently, a blade spring 240 in the dispenser applies pressing force to the transparent film indicator section 122 to seal it against the thermally conductive sheet.

With the thermometer now in operative condition, it can be used on a test subject. For example, it can be received in a person's mouth in conventional manner whereupon the thermally conductive sheet immediately conducts heat from the person's mouth to the thermally responsive substance in the various cavities 14. Since such substance is amenable to change of state, e.g., from a solid state to a liquid state at predetermined temperature, the substance in selected cavities will, depending upon the temperature of the test subject, change state and the indicator means associated with such selected cavities operatively respond to change of state to evidence initiation of such state change and signal the temperature of the test subject. FIG. 6 illustrates such temperature recordation which in the depicted example is 98.6°F. As mentioned earlier in this description, the indicator means 28 may be provided in various ways. In the depicted embodiment, the indicator means includes a dyestuff 42 and an acceptor 44 of an absorbent material. The dyestuff 42, e.g., a printed coating on the surface of acceptor 44 becomes wetted upon melting of the thermally responsive substance and migrates therewith to the acceptor 44, the appearance of the dyestuff through transparent film 28 being the visual evidence of the recorded temperature value. Other suitable arrangements of indicator means also could be employed.

With reference to FIG. 5 further features embodied in the shield 30 may be readily noted. FIG. 5 shows on greatly enlarged scale the condition of the indicator end of a thermometer 10 stored ready for use, e.g., in a suitable dispenser and in which condition it (the thermometer) is a compact structure with the respective components at the indicator end pressed down in relatively tight abutment with each other. It is desirable that the shield be provided on one or both of its opposite faces with means which prevent any chemical interaction between the thermally responsive substance 16, the adhesive on the transparent film 26, and any solvent of such adhesive. Thus for this purpose the flexible strip comprising shield 30 can be coated with a synthetic material such as nitrocellulose on the face thereof which is disposed against both the thermally responsive substance 16 and the indicator means 28. The other face of the shield, if desired, can be coated as at 262 with a layer of polyethylene. The manner of thus coating the shield provides the advantageous results stated above and additionally facilitates readily peeling the shield away from the indicator section 122 of transparent film 26 without disrupting the positioning of the indicator means. A further advantage of coating the shield with the material layer 260 is that such material layer overlays the entrance opening of the cavities 14 carrying the substance 16 and acts to seal such opening to prevent sublimation of the substance 16 while the thermometer is stored.

It will be apparent from a reading of the foregoing that the thermometer of the present invention while described in a representative embodiment as being used for human test subjects, can be used for other purposes in a wide range of commercial and industrial applications, particularly where it is desired to maintain the indicator means out of communication with the thermally responsive substance until needed for use to thereby preclude inoperability of the thermometer devices by accidental exposure to elevated temperatures.

WHAT IS CLAIMED IS:

1. A thermometer comprising an elongated thermally conductive sheet having a first longitudinal portion providing an indicator section, the remaining longitudinal portion of said sheet providing a handle section,
   a thermally responsive substance deposited on said thermally conductive sheet within the indicator section thereof, said substance being amenable to change of state at a predetermined temperature,
   a shield in overlying but unsecured contact with the indicator section of said thermally conductive sheet, and covering said thermally responsive substance,
   a transparent film coextensive with said thermally conductive sheet and having longitudinal portions thereof corresponding with the indicator section and handle section of said thermally conductive sheet, said transparent film having an adhesive face, the handle section of said transparent film being adhesively secured to the handle section of said thermally conductive sheet, and
   indicator means on the indicator section adhesive face of said transparent film, said indicator means when in communication with said thermally responsive substance being operably responsive to a change in state of said substance to evidence initiation of such state change, said shield covering said indicator means and being removably adhesively secured to the indicator section of said transparent film,
   said shield embodying pull tab means for peelably removing said shield from the indicator section of said transparent film in a direction away from the handle section of said transparent film, said indicator means being positioned on said transparent film indicator section such as to overlyingly registerably communicate with said thermally responsive substance when said shield is removed and the indicator section of said transparent film is pressed against the indicator section of said carrier sheet.

2. The thermometer of claim 1 wherein said thermally conductive sheet is provided with a plurality of shaped cavities in the indicator section thereof, said thermally responsive substance being deposited in each of said cavities, the respective cavities and thermally responsive substance therein being each associated with a predetermined temperature value different than that associated with any other cavity.

3. The thermometer of claim 1 wherein said shield is comprised of a strip of flexible material folded upon itself in at least one fold along a fold line to provide a first shield portion at least coextensive with the indicator section of said thermally conductive sheet and a second shield portion coextensive with the indicator section of said transparent film, said tab means being embodied in said first shield portion.

4. The thermometer of claim 3 wherein the shield is disposed such that said fold line is proximate the juncture of the respective indicator sections and handle sections of said thermally conductive sheet and said transparent film.

5. The thermometer of claim 4 wherein said shield is provided with a second fold of said strip of flexible material upon itself along a second fold line to provide a third shield portion joined with said first shield portion, said second fold line being remote from the first-mentioned fold line and adjacent the tip end of said thermally conductive sheet indicator section, said third shield portion being readily foldable in one direction to a position wherein it lies sandwiched intermediate said first and second portions and in an opposite direction outwardly of the tip end of said thermally conductive sheet indicator section, said third shield portion providing said pull tab means for digitally initiating peeling of said second shield portion from the indicator section of said transparent film.

6. The thermometer of claim 5 wherein said third shield portion is provided with reinforcing means to prevent severance of said third shield portion from said first shield portion when pulling force is applied thereto.

7. The thermometer of claim 6 wherein said reinforcing means comprise a strip of reinforcing tape adhered to said third shield portion.

8. The thermometer of claim 1 wherein said shield comprises a strip of a foil of a metal.

9. The thermometer of claim 8 wherein said strip of foil is coated with a material impermeable to both said thermally responsive substance and the adhesive on said transparent film.

10. The thermometer of claim 1 wherein said indicator means comprises a dyestuff and an absorbent material which absorbs the dyestuff and at least some of said thermally responsive substance when the latter undergoes a change of state to evidence initiation of such change.

11. The thermometer of claim 10 wherein said thermally responsive substance is a normally solid solution which melts at said predetermined temperature, said dyestuff comprising a printed coating thereof on a surface part of said absorbent material, said dyestuff being solubilized by said substance upon initiation of melting of the same.

12. The thermometer of claim 1 wherein said thermally conductive sheet is a foil of a metal having opposite face surfaces, the thermally responsive substance being deposited on one of said face surfaces.

13. The thermometer of claim 12 wherein the other face surface of said thermally conductive sheet is provided with a coating of a polymeric material.

* * * * *